United States Patent [19]

Giffin, III et al.

[11] Patent Number: 4,809,498

[45] Date of Patent: Mar. 7, 1989

[54] GAS TURBINE ENGINE

[75] Inventors: Rollin G. Giffin, III; Dean T. Lenahan, both of Cincinnati, Ohio

[73] Assignee: General Electric Company, Lynn, Mass.

[21] Appl. No.: 208,803

[22] Filed: Jun. 20, 1988

Related U.S. Application Data

[63] Continuation of Ser. No. 70,020, Jul. 6, 1987, abandoned.

[51] Int. Cl.[4] .................................................. F02C 3/067
[52] U.S. Cl. .................................... 60/39.162; 416/171; 416/129; 416/DIG. 2
[58] Field of Search .................. 60/226.1, 262, 39.162, 60/268; 416/DIG. 2, 223 A, 171, 129

[56] References Cited

U.S. PATENT DOCUMENTS

| | | | |
|---|---|---|---|
| 1,749,528 | 3/1930 | De Freudenreich et al. | 416/223 A |
| 2,378,372 | 6/1945 | Whittle | 416/223 A |
| 2,428,330 | 9/1947 | Heppner | 60/35.6 |
| 2,454,738 | 11/1948 | Hawthorne | 170/135.6 |
| 2,455,458 | 12/1948 | Whittle | 60/35.6 |
| 2,471,892 | 5/1949 | Price | 60/35.6 |
| 2,477,798 | 8/1949 | Griffith | 60/35.6 |
| 2,478,206 | 8/1949 | Redding | 60/35.6 |
| 2,488,783 | 11/1949 | Stalker | 170/135.24 |
| 2,505,660 | 4/1950 | Baumann | 60/35.6 |
| 2,575,682 | 11/1951 | Price | 60/35.6 |
| 2,584,555 | 2/1952 | Cleave et al. | 253/16.5 |
| 2,608,821 | 9/1952 | Hunsaker | 60/35.6 |
| 2,639,583 | 5/1953 | Steele | 60/39.16 |
| 2,914,296 | 11/1959 | Bloomberg | 253/16.5 |
| 3,363,419 | 1/1968 | Wilde | 60/226 |
| 3,381,475 | 5/1968 | Roberts | 60/226 |
| 3,475,108 | 10/1969 | Zickuhr | 416/DIG. 2 |
| 3,635,576 | 1/1972 | Wieckmann | 415/65 |
| 3,703,081 | 11/1972 | Krebs et al. | 60/226 R |
| 3,797,239 | 3/1974 | Hausmann et al. | 60/268 |
| 3,861,139 | 1/1975 | Jones | 60/226 |
| 4,159,624 | 7/1979 | Gruner | 60/39.16 |
| 4,463,553 | 8/1984 | Boudigues | 60/268 |
| 4,571,935 | 2/1986 | Rice | 60/39.05 |

FOREIGN PATENT DOCUMENTS

| | | | |
|---|---|---|---|
| 612838 | 11/1948 | United Kingdom . | |
| 800602 | 8/1958 | United Kingdom . | |
| 908748 | 10/1962 | United Kingdom . | |
| 2129502 | 5/1984 | United Kingdom | 60/39.162 |
| 2155110 | 9/1985 | United Kingdom . | |

OTHER PUBLICATIONS

Baumeister, Theodore: *Standard Handbook for Mechanical Engineers*, 1967, p. 9–153.
Skrotzki, B. G. A.: *Power*, Jun. 1962, "Steam Engines," pp. S1–S10.
Treager, I. E.: *Aircraft Gas Turbine Engine Technology*, 1970, 1979, pp. 143–150.
Pickett, Dr. G. F. et al: "Turbine Technology and Design," a presentation for University of Tennessee short course on Aero-Propulsion, 1 Dec. 86, unnumbered pages from Introduction and Fundamentals sections.
Wilson, D. G.: *The Design of High-Efficiency Turbomachinery and Gas Turbines*, 1984, pp. 189–203; 239–279.
Shepherd, D. G.: *Principles of Turbomachinery*, 1956, pp. 82–97; 172–178; and 190–195.

Primary Examiner—Donald E. Stout
Attorney, Agent, or Firm—Francis L. Conte; Derek P. Lawrence

[57] ABSTRACT

An improved gas turbine engine is disclosed. The engine includes counterrotating first and second turbine rotors without an intervening nozzle. Disclosed also are means for obtaining pitch relative outlet velocity greater than pitch absolute inlet velocity for at least one of the rotors. In one embodiment, the reaction of at least one of the rotors is greater than a reference reaction effecting peak efficiency of the one turbine. Advantages include improved overall engine efficiency and decrease in weight, reduced cooling flow and complexity of the engine.

74 Claims, 4 Drawing Sheets

GAS TURBINE ENGINE

The U.S. Government has rights in this invention in accordance with Contract F33657-83-C-2005 awarded by the Department of the Air Force.

This is a continuation of application Ser. No. 070,020 filed on July 6, 1987, now abandoned.

BACKGROUND OF THE INVENTION

This invention relates generally to gas turbine engines, and, more specifically, to a new and improved gas turbine engine having improved efficiency.

A significant goal for advancing gas turbine engine technology is providing improved engine thermal efficiency. One measure of efficiency is the engine's energy output divided by fuel energy input, which may be represented, for example, by specific fuel consumption (SFC), which is the ratio of fuel flow in pounds per hour divided by thrust of the engine in pounds.

The overall efficiency of an engine is affected by the efficiency of its various components. One significant engine component which substantially affects efficiency is the turbine. A conventional turbine includes one or more alternating rows of stationary stator nozzle blades and rotating turbine blades and may also include one or more turbine rotors, for example a high pressure turbine (HPT) driving a compressor in serial flow relationship with a low pressure turbine (LPT) driving, for example either a fan or low pressure compressor.

Modern day and advanced gas turbine engines operate at relatively high combustion gas temperatures for reducing SFC. Such relatively high temperatures typically require cooling of turbine blades, which is accomplished by bleeding a portion of compressor air and channeling it through the turbine blades for cooling. Inasmuch as this cooling air is bypassed from the main flowpath of the engine for cooling, a reduction in overall engine efficiency necessarily occurs.

A gas turbine engine is typically designed for obtaining a desired amount of work from the turbine thereof. Relatively high efficiency and relatively low quantities of cooling air as described above are two of many conventional goals utilized in designing the turbine.

Other goals utilized in designing turbines include relatively high performance and thrust; relatively low weight, cost and fuel flow; simplicity; and small size. Although meeting all these goals is desirable, actual design practice requires tradeoffs between them.

Also utilized in designing turbines are many conventional given turbine specifications including, for example, fluid temperatures and pressures at blade inlets and outlets, turbine power output required and shaft speeds. Velocity vector diagrams of fluid flow through turbine blade rows are then conventionally chosen at a preferred radius, such as at either the blade, hub (i.e. 0 percent blade height) or blade pitch/meanline radius (i.e. 50 percent blade height). The velocity diagrams typically include the velocity vectors of fluid flow at turbine blade inlets and outlets.

Velocity vector diagrams at other radial locations of the blades are next conventionally determined consistent with, among other things, radial equilibrium of the fluid flowing thereover. Radial equilibrium is a condition wherein the radial pressure force on the fluid is equal and opposite to the centrifugal force acting on the fluid due to tangential components of velocity therein.

The shape and size of the blades, including angular orientation of all sections thereof, are next conventionally generated from the velocity vector diagrams for defining the entire blade outer surface. Of course, additional conventional practices are also utilized for finally defining a preferred turbine design.

Reaction is a conventionally known parameter useful in defining the type of a turbine. Reaction has many alternative definitions including, for example, the percent stage static enthalpy drop occurring in a turbine rotor, and may be expressed in terms of temperature, Pressure or velocity parameters. Inasmuch as reaction may be expressed in terms of velocity, it follows that reaction may also be used as an indication of velocity vector diagrams and, therefore, as an indication of blade shape and orientation.

Two fundamental and conventionally known types of turbine blading include reaction blades and impulse blades. All gas turbines have blades which vary in the degree of reaction from hub to tip as a result of radial equilibrium conditions as indicated above. Inasmuch as reaction necessarily increases from hub to tip, a single reaction value, such as that at the pitch or meanline, is typically utilized to define the type of turbine.

A pure impulse turbine (i.e. 0 percent reaction) has blades which are generally symmetrical, crescent-shaped airfoils having a generally uniform channel between adjacent blades for obtaining equal inlet and outlet areas and fluid velocities. A reaction turbine has blades which are unsymmetrical, having relatively thick leading edge portions and thin trailing edge portions, adjacent ones of which define a converging channel for accelerating a fluid therebetween for obtaining a higher outlet velocity than the inlet velocity. In an impulse turbine no static pressure drop exists across the blades thereof, and in a reaction turbine a static pressure drop from inlet to outlet is effected.

Conventional turbines have pitch reactions ranging from about 10 percent up to about 50 percent. Reactions of 40 percent to 50 percent usually result in optimum performance or peak efficiency for a turbine stage according to two prior art references. One of those references also teaches peak efficiency when velocity vector diagrams are symmetrical.

Although the prior art teaches that optimum performance may be obtained at 40–50 percent reaction, relatively high reaction includes some negative tradeoffs as well. For example, increasing reaction increases the discharge swirl angle of gases leaving a turbine which must be accommodated by increasing the turning ability of downstream blades. Not only does increased swirl angle result in a more complex downstream blading, it also increases aerodynamic losses of the highly-turned gas flow.

Increased reaction also increases the acceleration, discharge Mach number and pressure drop of gases being channeled through the turbine blades. Inasmuch as aerodynamic efficiency losses are proportional to the square of velocity, relatively high reactions may result in relatively high mixing losses of blade trailing edge aperture discharge air. Also, the increased pressure drop will cause increased leakage of gas flow over blade tips.

Conventional turbines typically also include a compressor discharge, or thrust balance, seal for reducing differential internal thrust forces to a level that is manageable with conventional thrust bearings. More specifically, air is discharged from the last compressor rotor of a gas turbine engine at a first pressure which acts over an outlet area of the compressor, resulting in a forward generated force. Combustion gases at the inlet of the turbine rotor section of the engine are at a second pressure and act across an inlet area of the turbine for generating an aft-directed force. The forward force is substantially larger than the aft force, which is one reason for requiring the use of a thrust bearing to accommodate differential thrust acting on the compressor-turbine shaft. The compressor discharge seal is typically provided between the compressor and the combustor to reduce the area over which the compressor discharge pressure would otherwise act for reducing the forward thrust force. Inasmuch as the compressor discharge seal adds weight and complexity to an engine, it would be desirable if its use were not required.

OBJECTS AND SUMMARY OF INVENTION

Accordingly, an object of the present invention is to provide a new and improved gas turbine engine having improved overall engine efficiency.

Another object of the present invention is to provide a gas turbine engine having relatively fewer components when compared to conventional turbines for reducing cooling requirements, size and weight, and improving simplicity.

Another object of the present invention is to provide a gas turbine engine which does not require a stator nozzle between the high pressure and low pressure turbine rotors thereof.

Another object of the present invention is to provide a gas turbine engine having relatively low differential thrust forces acting on a compressor and turbine thereof without the complexity of an additional thrust balance seal.

In accordance with an exemplary embodiment of the invention, a gas turbine engine is disclosed which comprises in serial flow relationship compressing means, combusting means, a first turbine rotor rotatably connected to the compressing means, and a second turbine rotor rotatable in a direction opposite to that of the first turbine rotor and being in direct flow communication therewith, and means for obtaining a relative velocity of combustion gases at an outlet of blades of at least one of the turbine rotors which is greater than an absolute velocity of the gases at an inlet of the blades of the one turbine rotor (i.e. $W_2$ greater than $C_1$). Another embodiment of the invention includes means for obtaining a reaction of at least one of the turbines which is greater than a reference reaction effecting a peak efficiency of the one turbine.

BRIEF DESCRIPTION OF THE DRAWINGS

The novel features believed characteristic of the invention are set forth in the claims. The invention, in accordance with preferred and exemplary embodiments, together with further objects and advantages thereof, is more particularly described in the following detailed description taken in conjunction with the accompanying drawing in which:

DETAILED DESCRIPTION

Figure 1:
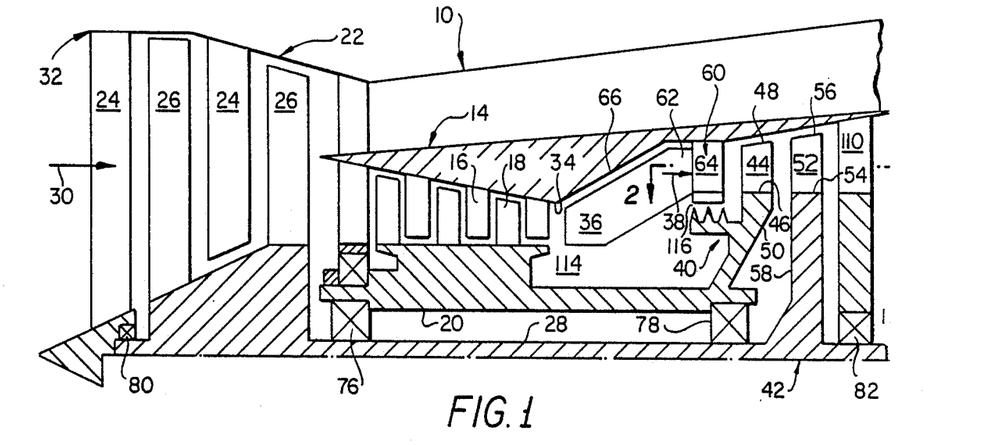
FIG. 1 is a schematic representation of a gas turbine engine in accordance with one embodiment of the present invention.

Illustrated in FIG. 1 is a schematic representation of a gas turbine engine 10 in accordance with a preferred and exemplary embodiment of the present invention. The engine 10 includes an axial centerline axis 12, about which is positioned a conventional first means for compressing air, or high pressure compressor (HPC) 14, which includes alternating rows of compressor stator blades 16 and rotor blades 18. The blades 18 are suitably secured at radially inner hub ends thereof to a first rotor shaft 20.

The engine 10 further includes a conventional second means for compressing air, or low pressure compressor (LPC) 22, disposed upstream of the HPC 14 and in direct serial flow communication therewith. The LPC 22 includes a plurality of alternating rows of stator blades 24 and rotor blades 26. The blades 26 are suitably mounted at hubs thereof to a second rotor shaft 28 for rotation therewith. The second shaft 28 is suitably supported concentrically within the first shaft 20.

Air 30 enters the LPC 22 at an inlet 32 and is compressed through the LPC 22 and, in turn, by the HPC 14 and is discharged at an outlet 34 of the HPC 14.

The engine 10 further includes conventional means 36 for combusting the compressed air 30 received from the HPC 14 with a fuel and generating combustion gases 38. The combusting means 36, or simply combustor 36, includes a conventional fuel injector and igniter (not shown) for providing fuel and initiating combustion. The combustor 36 is disposed downstream of the HPC 14 in direct serial flow communication therewith for receiving the compressed air 30 from the outlet 34 for mixing with fuel inside the combustor 36 for generating the combustion gases 38.

In accordance with preferred and exemplary embodiments of the present invention, the engine 10 includes first and second counterrotating turbine rotors 40 and 42, respectively, without an intervening stationary turbine nozzle.

The first turbine rotor 40, or high pressure turbine (HPT) 40, includes a plurality of circumferentially spaced first turbine blades 44, each having a hub 46 at the radially inner end thereof which defines a radially inner boundary for flow of the gases 38. Each blade 44 also includes a tip 48 at the radially outer end thereof. The hubs 46 are suitably fixedly mounted to the radially outer circumference of a first rotor disk 50.

The second turbine rotor 42, or low pressure turbine (LPT) 42, includes a plurality of circumferentially spaced second turbine blades 52, each having a hub 54 at a radially inner end thereof and a tip 56 at a radially outer end thereof. The hubs 54 are suitably fixedly mounted to the radially outer circumference of a second rotor disk 58.

The engine 10 further includes a high pressure turbine (HPT) nozzle 60, located at an outlet 62 of the combustor 36. As illustrated in more particularity in FIG. 2, the HPT nozzle 60 includes a plurality of circumferentially spaced stationary nozzle blades 64, suitably fixedly secured at radially outer ends thereof to an engine outer casing 66. The HPT nozzle 60 includes conventional cooling means 68, including, for example, an aperture through the casing 66, for channeling pressurized cooling air 30 from the compressor to the interior of the blades 64. The blades 64 may include conventional film-cooling holes 70, which discharge the cooling air 30 as a film along the lateral surface of the blades 64 for providing cooling. Similar film-cooling holes 72 may be provided in the first turbine blades 44 and are supplied with pressurized compressor air 30 from conventional means 74 including, for example, a channel through the disk 50 and into the blades 44.

As illustrated in FIG. 1, the first shaft 20 extends from the blades 18 of the HPC 14 to the first disk 50 of the HPT 40 for joining the HPT 40 to the HPC 14 for rotation therewith. The first shaft 20 is conventionally mounted at forward and aft ends by, for example, bearings 76 and 78, respectively.

The second shaft 28 extends from the blades 26 to the second disk 58 for joining the LPC 22 to the LPT 42 for rotation therewith. The second shaft 28 is conventionally mounted at forward and aft ends thereof by, for example, bearings 80 and 82, respectively.

In this exemplary serial arrangement of LPC 22, HPC 14, combustor 36, HPT 40 and LPT 42, the HPT 40 is rotatable at speeds at least as large as those of the LPT 42, i.e. rotational speeds greater than or equal to those of the LPT 42.

Figure 2:
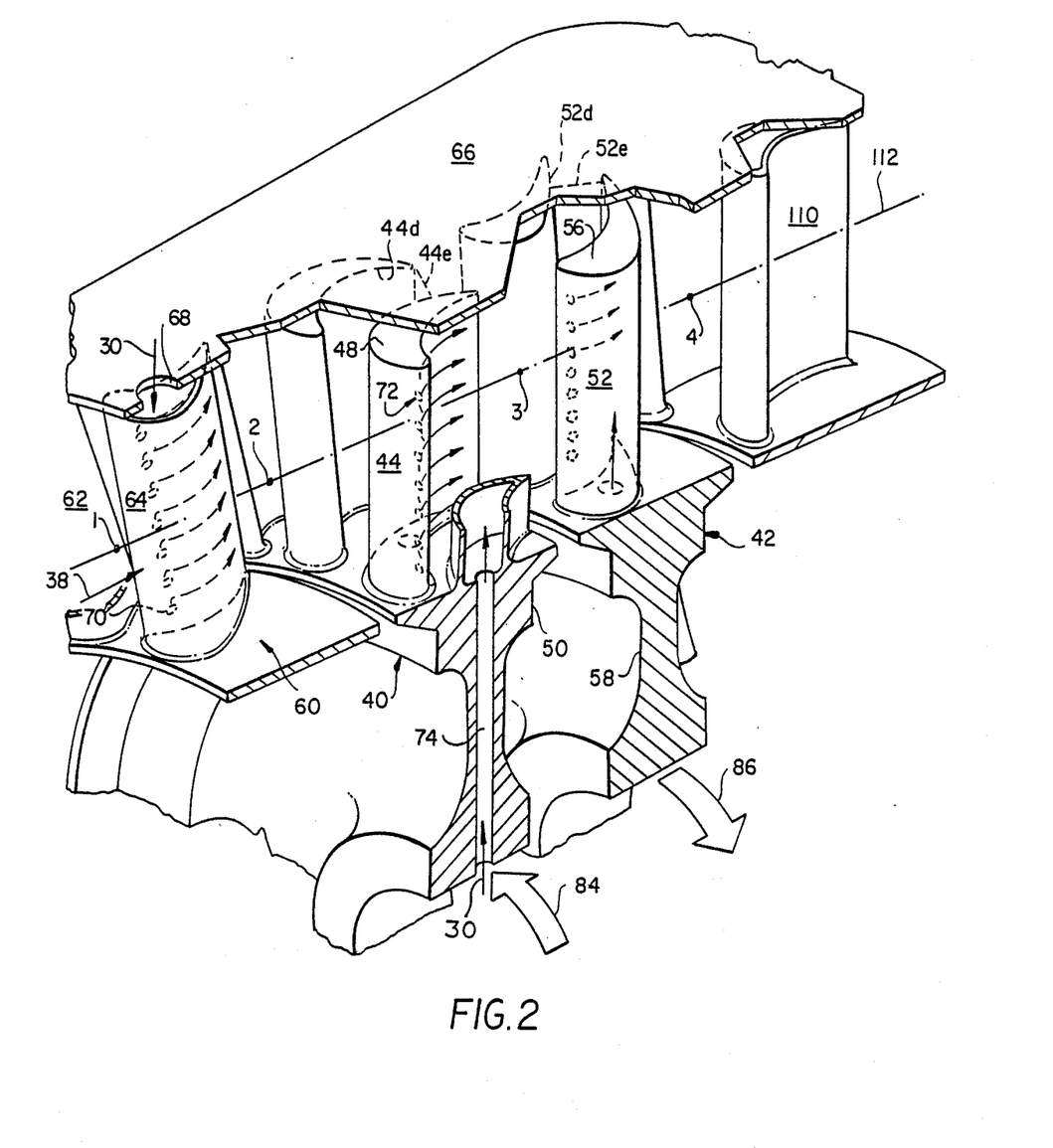
FIG. 2 is an isometric view of the turbine region illustrated in FIG. 1.

As illustrated in FIG. 2, the HPT nozzle 60 is located at the combustor outlet 62 and receives the combustion gases 38 therefrom. The combustion gases 38 flow over the nozzle blades 64 and to the HPT 40, which is disposed immediately downstream of the nozzle 60. The LPT 42 is disposed immediately downstream of the HPT 40 and in direct serial flow communication with the HPT blades 44 for receiving the combustion gases 38 which are channeled between the HPT blades 44 and then between the LPT blades 52. The HPT blades 44 and the LPT blades 52 have opposite orientations so that the HPT 40 rotates in a first direction 84 and the LPT 42 rotates in a second direction 86, which is opposite to the first direction 84 for providing counterrotation of the HPT 40 relative to the LPT 42.

A significant feature of the present invention includes the particular shape, including angular orientation, of the blades 44, 52 and/or 64. As described above, blade shape can be conventionally determined from preferred velocity vector diagrams. A preferred velocity vector diagram may result in different blade shapes, depending on the other conventional parameters used in turbine design. However, in accordance with one embodiment of the present invention, a preferred velocity vector diagram is disclosed which will allow those skilled in the art to obtain or design particular shapes for the blades 44, 52 and 64, which, in combination with the counterrotating HPT 40 and LPT 42, will result in the new and improved gas turbine engine 10 disclosed herein.

Also, as described above, reaction may be used to indicate velocity vector diagrams, and thereby is also an indication of or means for obtaining a turbine type and/or blade shape. In order to more fully appreciate the significance of the invention, reference is now made in general to FIGS. 3-9.

Reaction is a parameter which directly affects the shape of turbine blades. Reaction has separate values for flow passing between the HPT blades 44 and the LPT blades 52, and typically increases from blade hub to tip due to radial equilibrium conditions as described above. A given turbine stage is typically conventionally defined by reference to its pitch reaction, i.e. that reaction occurring at the pitch or mid span portion of the turbine blade, with the reaction for the remainder of the blade being conventionally determined consistent with radial equilibrium.

Figure 3:
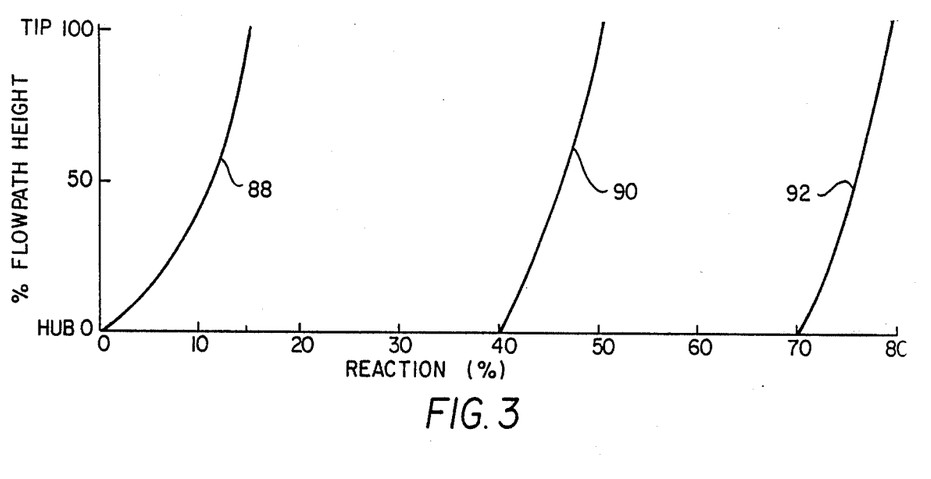
FIG. 3 is a graph illustrating reaction expressed in percent versus the percent flowpath height from hub to tip of turbine blades for conventional impulse and reaction type blading and the relatively high reaction blading in accordance with one embodiment of the invention.

For comparison purposes, FIG. 3 illustrates reaction expressed in percent versus percent (%) flowpath height from hub to tip for three turbine blade arrangements. Curves 88, 90 and 92 represent reaction from hub to tip of three types of blades identified as 12 percent pitch reaction, or substantially impulse-type; 47 percent pitch reaction; and 76 percent pitch reaction, respectively. The 12 percent and 47 percent pitch reaction blades are conventional, as found in the prior art, and the 76 percent relatively high pitch reaction blades are exemplary of one embodiment of the present invention.

Figure 4:
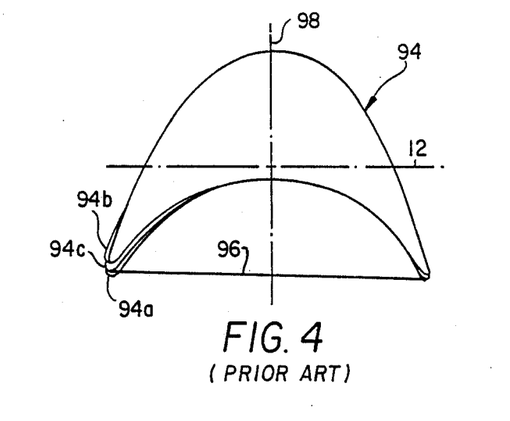
FIG. 4 illustrates a top view of a prior art impulse-type blade having the general reaction profile illustrated in one curve of FIG. 3.

Illustrated in FIG. 4 is an exemplary conventional, prior art impulse-type blade 94 having a generally symmetrical crescent shape. The blade 94 is oriented with its pitch chord 96, which extends between the trailing and leading edges at the pitch section 94c, disposed generally parallel to an axial centerline axis, such as axis 12, and generally perpendicular to an engine tangential axis, such as axis 98 of the engine 10, which is in the direction of rotation of the blade 94 in an engine. The hub outline of the blade 94 is designated 94a, the tip outline of the blade 94 is designated 94b, and the pitch outline is designated 94c. The blade 94 will effect the general reaction profile represented by the curve 88 illustrated in FIG. 3 having a zero reaction at the hub and increasing to about 15 percent reaction at the tip thereof.

Figure 5:
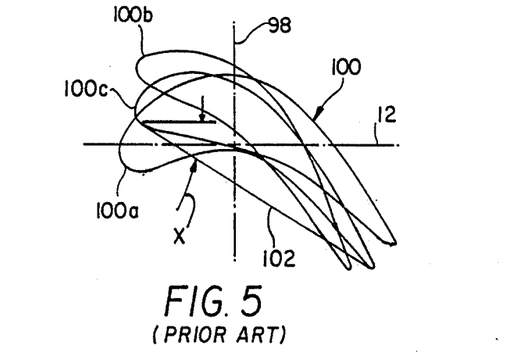
FIG. 5 is a top view of a prior art reaction blade having the general reaction profile illustrated in another curve of FIG. 3.

Illustrated in FIG. 5 is another exemplary conventional, prior art reaction, or 47 percent pitch reaction, turbine blade 100. The hub outline of the blade is designated 100a, the tip outline of the blade is designated 100b, and the pitch outline is simply designated 100c. The pitch chord 102 is disposed at a stagger angle X of 30 degrees relative to an axial centerline axis, such as axis 12. The blade 100 will effect the general reaction profile represented by the curve 90 in FIG. 3, having about 40 percent reaction at the hub and about 51 percent reaction at the tip.

Figure 6:
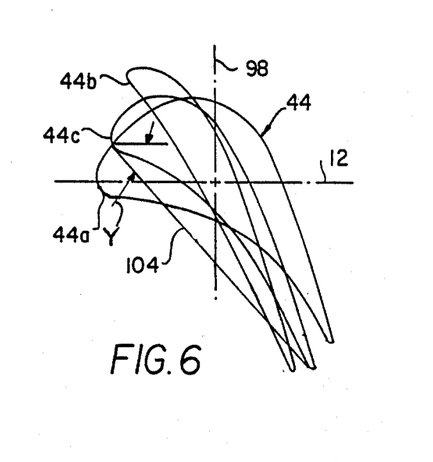
FIG. 6 is a top view of a high reaction blade in accordance with one embodiment of the invention having the general reaction profile illustrated in another curve of FIG. 3.

Illustrated in FIG. 6 is an exemplary relatively high pitch reaction blade in accordance with one embodiment of the invention, wherein the HPT turbine blade 44 has a pitch reaction of about 76 percent. The hub outline is designated 44a, the tip outline is designated 44b, and the pitch outline is designated 44c. The shape of blade 44 is unsymmetrical, in contrast with the symmetrical blade 94 of FIG. 4, and has a relatively wide leading edge region and relatively narrow trailing edge region. The blade 44 is also wider at its hub 44a and decreases in thickness toward its tip 44b.

The HPT blade 44 illustrated in FIG. 6 also has a pitch chord 104 extending between the trailing and leading edges of the blade at a stagger angle Y of about 50 degrees relative to the axis 12. The stagger angle Y in aero terms is substantially larger than the stagger angle X of the conventional reaction blade 100. The blade 44 is typically twisted from hub-to-tip, with the angle of the tip chord being yet larger than the angle Y of the hub and pitch chords. The blade 44 illustrated in FIGS. 2 and 6 will, in accordance with analysis and confirmed by test, effect the general reaction profile represented by curve 92 in FIG. 3, having about 70 percent reaction at the hub and about 78 percent reaction at the tip thereof.

Figure 7:
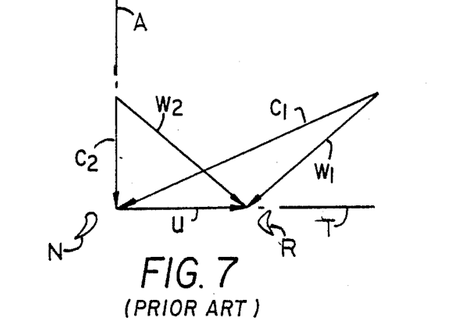
FIG. 7 is a pitch turbine-stage velocity vector diagram for a prior art turbine nozzle and rotor having blades generally similar to those illustrated in FIG. 4.
Figure 8:
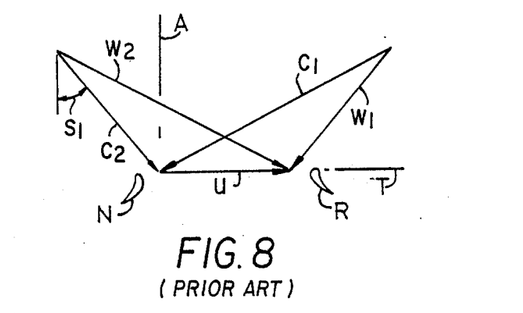
FIG. 8 is a pitch turbine-stage velocity vector diagram for a prior art turbine nozzle and rotor having blades generally similar to those illustrated in FIG. 5.
Figure 9:
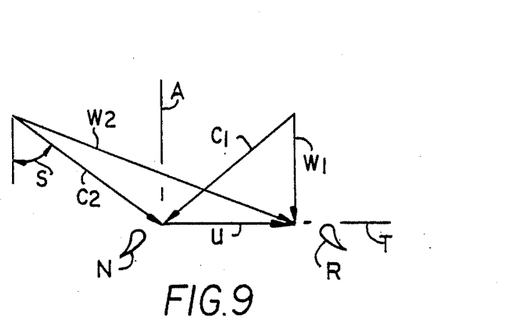
FIG. 9 is a pitch turbine-stage velocity vector diagram for axially adjacent blades generally similar to those illustrated in FIG. 6 in accordance with one embodiment of the invention.

To more fully appreciate the substantial departure of the present invention from prior art structures, an examination of the velocity vector diagrams of FIGS. 7-9 is appropriate. Just as reaction typically varies from hub to tip of a blade to satisfy radial equilibrium, so must the velocity vector diagrams. FIGS. 7-9 illustrate the diagrams at blade pitch, or 50 percent blade (flowpath) height, and the diagrams at the other blade sections would then be conventionally determined.

Each of FIGS. 7-9 illustrates a blade section at the left which represents an upstream blade designated N to indicate generically a nozzle blade, and a blade section at the right which represents a blade directly downstream from blade N and designated R to indicate generically a rotor blade. $C_1$ represents the absolute velocity vector of flow being discharged from the blades N or, alternatively, of inlet flow to the blades R. $W_1$ represents the velocity vector of the $C_1$ flow measured relative to the moving blades R. $C_2$ represents the absolute velocity vector of flow being discharged from the blades R, and $W_2$ represents the velocity vector thereof relative thereto. The peripheral velocity vector of the illustrated blade R cross sections is designated u, and may, alternatively, be referred to as the tangential velocity vector, i.e. the velocity as measured parallel to a blade tangential axis designated T. An axial axis designated A is disposed perpendicularly to the tangential axis T.

$C_1$, $C_2$, $W_1$, $W_2$ and u are conventional parameters which may have different designations in the art to represent velocity vectors but represent conventionally known parameters. Of course, specific velocity vector diagrams are also conventionally generated for the various other radial sections of a blade, and for each blade row of the engine.

FIG. 7 illustrates generally the pitch velocity vector diagram for the prior art impulse-type blade 94 illustrated in FIG. 4. Blade N represents a conventional stationary nozzle blade which channels gas to the rotor blade R, i.e. 94, disposed directly downstream therefrom. The blades illustrated in FIG. 7 are generally uniformly spaced from circumferentially adjacent blades (not shown), having generally equal inlet and outlet flow areas defined between the leading edges and trailing edges, respectively, of the adjacent blades. The inlet and outlet velocities $W_1$ and $W_2$, respectively, are generally equal, and $W_2$ is less than $C_1$.

Reaction blades, in contrast, as illustrated by blades 100, 44 and 52 in FIGS. 2, 5 and 6, are spaced from each other for defining a conventional-type converging nozzle (e.g. 44d and 52d in FIG. 2) therebetween for accelerating flow therethrough to a conventional-type throat area defined generally near trailing edges of adjacent blades (e.g. 44e and 52e in FIG. 2). Reaction blades accelerate the flow of a gas therebetween with the outlet velocity $W_2$ being greater than the inlet velocity $W_1$. Furthermore, reaction blades also experience a pressure drop between the leading edges and trailing edges of the blades.

FIG. 8 illustrates generally the pitch velocity vector diagram for the prior art blade 100 illustrated in FIG. 5. Blade N represents a conventional stationary nozzle blade which channels gas to the rotor blade R, i.e. blade 100, disposed directly downstream therefrom. The diagram is symmetrical with the inlet and outlet velocities $C_1$ and $W_2$, respectively, being equal. The absolute discharge swirl angle $S_1$, as measured relative to the vector $C_2$, for gases being discharged from the rotor blades R is about 40 degrees.

FIG. 9 illustrates generally the pitch velocity vector diagram for the relatively high reaction blade 44 illustrated in FIG. 6, in accordance with a preferred exemplary embodiment of the invention. In this diagram blade N represents the nozzle blade 64 and blade R represents the HPT blade 44. A significant feature of the blades 44 and the vector diagram is $W_2$ being greater than $C_1$.

Another feature of relatively high reaction blades 44 is the relatively high absolute discharge swirl angle S for gases being discharged from the turbine blades 44 as shown in FIG. 9 by the angle of the absolute velocity vector $C_2$. The swirl angle S for the embodiment illustrated at a pitch reaction $R_1$ of 76 percent associated with operation at the group peak efficiency in FIG. 10 has a value of about 55 degrees. The swirl angle S would be about 50 degrees for a pitch reaction $R_1$ of 68 percent associated with operation at the stage peak efficiency in FIG. 10.

Yet another significant feature of the relatively high reaction blades 44 is the relatively high pitch stagger angle Y as above described, which is greater than the pitch stagger angle X of the conventional reaction blade 100.

Figure 10:
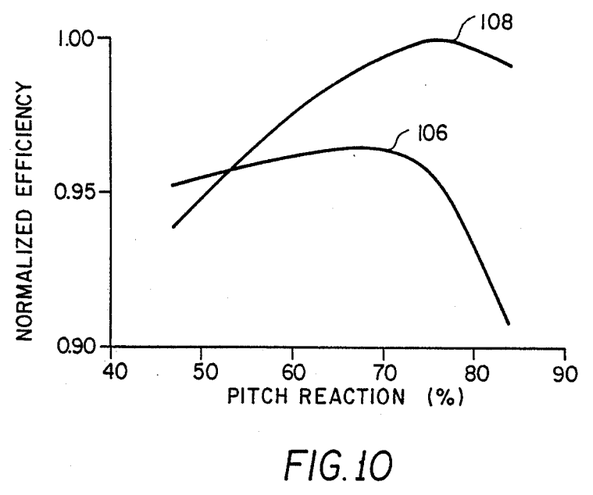
FIG. 10 is a graph illustrating normalized efficiency as a function of reaction.

FIG. 10 is a graph which plots normalized efficiency versus percent pitch reaction. Efficiency is conventionally determined and may be represented by actual work divided by ideal work. Curve 106 represents the efficiency for the turbine stage, including HPT 40 and HPT nozzle 60, by itself. Curve 108 represents the efficiency of the turbine group including HPT nozzle 60, HPT 40, LPT 42 and a plurality of circumferentially spaced stationary outlet guide vanes (OGVs) 110 suitably supported to the casing 66 directly downstream of the LPT blades 52 in serial flow communication therewith. The OGVs 110 are also referred to as deswirl vanes and are used when deswirling of the gas discharged from the LPT 42 is required. The data points for both curves for 76 percent pitch reaction resulting in peak group efficiency are based on test data, with the remainder of both curves being based on analysis. The curves 106 and 108 are normalized with respect to the peak group efficiency. The stage efficiency curve 106 illustrates generally that the efficiency of a turbine stage reaches a peak at a certain value of reaction, for example at about 68 percent reaction in the embodiment shown.

With respect to turbine stage efficiency alone, an engine designer may conventionally generate a graph of efficiency versus reaction for a given turbine application to determine a reaction level for obtaining a peak value of efficiency for that turbine stage. For example, the prior art teaches optimum or peak efficiency or performance for reaction levels of 40 percent to 50 percent.

As presented above, increasing values of reaction, in particular past the value for peak efficiency, e.g. 50 percent, necessarily results in a decrease in efficiency for a given stage as illustrated in FIG. 10. Discharge swirl angles (angle S) are also increased, as well as mixing losses in the turbine. Also associated with higher reaction are increased turbine losses due to blade tip clearance leakage caused by increased pressure drop and increased broach angle on blade dovetails, which increases the difficulty of mounting blades in their supporting disk.

The inventors have discovered that relatively high reaction turbine blading may be utilized in conjunction with counterrotating, high and low pressure turbines without an intermediate nozzle in accordance with one embodiment of the invention for obtaining improved overall engine efficiency, and, for example, a decrease in complexity, number of components, length, weight, cooling air flow requirements and manufacturing cost. More specifically, and for example, the inventors have discovered that the otherwise undesirably high swirl angles associated with relatively high reaction of the HPT 44, as illustrated in FIG. 9, are well accommodated with minimal efficiency losses by the use of the counterrotating LPT 42 instead of a corotating LPT which would otherwise require an intervening stator nozzle. The relatively large discharge swirl angle S associated with velocity vector $C_2$ illustrated in FIG. 9 at the outlet of the turbine blades 44 is well matched to a velocity vector $C_1$, analogous to that shown in FIG. 9 which would be required at the inlet to turbine blades 52 of the LPT 42 (not shown).

The inventors have also discovered that although reactions greater than that for peak efficiency for a given stage necessarily result in decreased stage efficiency, such decreased efficiency may be acceptable in view of an overall increase in efficiency of the engine 10, in particular the turbine group described above.

More specifically, the 68 percent reaction point of stage curve 106 in FIG. 10 represents an exemplary reference pitch reaction $R_0$ which effects a peak efficiency for a turbine stage. However, tests have indicated that relatively high pitch reaction, although resulting in decreased stage efficiency, results in increased group efficiency. For example, 76 percent pitch reaction for HPT 40, which is greater than the reference pitch reaction $R_0$, results in peak group efficiency, as illustrated by the peak in group curve 108, although the efficiency of the stage itself is reduced.

Because increased reaction increases the pressure drop across a turbine rotor such as HPT 40, the velocity of the combustion gases 38 flowing through the HPT nozzle 60 is reduced, therefore decreasing the differential velocity between the gases 38 and the cooling air 30 being discharged through the cooling holes 70 as illustrated in FIG. 2, thus reducing the mixing losses in the nozzle which would otherwise be substantially larger. However, the increased reaction may also increase the cooling air mixing losses in the HPT 40 due to the increased velocity of gases thereover; but, inasmuch as the quantity of cooling air typically used to cool the HPT nozzle 60 is about twice that used for the HPT 40, there is a net gain. Additional advantages of the relatively high pitch reaction in accordance with this invention are described below.

In order to define pitch reaction, FIG. 2 illustrates four conventional stations designated 1, 2, 3 and 4, which correspond to locations at the combustor outlet 62, the position between the HPT nozzle 60 and the HPT 40, the position between the HPT 40 and the LPT 42, and the outlet position of the LPT 42, respectively, all at a common streamline located at a pitchline 112 passing through 50 percent blade height positions. Stations 1, 2, 3 and 4 may, alternatively, be referred to as the inlet of the nozzle 60; outlet of the nozzle 60 or inlet of the HPT 40; outlet of the HPT 40 or inlet of the LPT 42; and outlet of the LPT 42, respectively, or of the blades thereof, at the pitchline 112.

As indicated above, reaction may be conventionally defined in various manners. For the HPT 40, reaction is defined as the percent stage static enthalpy drop occurring in a turbine rotor. The pitch reaction for the HPT 40 is the abscissa in FIG. 10 and may be designated as the first pitch reaction $R_1$ and defined by the expression:

$$R_1 = (H_{S2} - H_{S3})/(H_{S1} - H_{S3}) \times 100\%$$

where $H_{S2}$ represents the conventionally known static enthalpy at the station 2 inlet to the HPT 40, where $H_{S3}$ represents the conventionally known static enthalpy at the station 3 outlet of the HPT 40, and where $H_{S1}$ represents the conventionally known static enthalpy at the station 1 outlet of the combustor 36 and inlet to the HPT nozzle 60.

Inasmuch as there is no inlet nozzle to the LPT 42, the pitch reaction of the LPT 42, stage or rotor, may be defined by the alternate expression and designated the second pitch reaction $R_2$:

$$R_2 = (H_{S3} - H_{S4})/(H_{T3} - H_{S4}) \times 100\%$$

where $H_{S3}$ represents the conventionally known static enthalpy at the station 3 outlet of the HPT 40 between the HPT 40 and the LPT 42, where $H_{S4}$ represents the conventionally known static enthalpy at the station 4 outlet of the LPT 42, and where $H_{T3}$ represents the conventionally known total enthalpy at the station 3 inlet of the LPT 42.

Tests have shown that the HPT 40 and LPT 42 having first and second pitch reactions $R_1$ and $R_2$ of 76 percent and 52 percent, respectively, result in an overall efficiency improvement of the turbine group of an engine, notwithstanding any decrease in efficiency of the HPT 40 by itself. FIG. 10 illustrates that although the stage efficiency is below its peak in curve 106 at a pitch reaction $R_1$ of 76 percent, the group efficiency is at its peak as shown in curve 108.

Furthermore, the increased reaction in accordance with the invention allows for fewer turbine blades for a given desired work output from the blades.

As indicated above, a significant feature of one embodiment of the present invention is the means for obtaining a pitch reaction of a turbine which is greater than the reference pitch reaction $R_0$ which effects the peak efficiency for the turbine. First reaction means comprising the shape, including angular orientation, of the blades 44 as illustrated in FIGS. 2, 6 and 9 are used for obtaining the relatively high pitch reaction $R_1$ for the HPT 40 greater than the reference peak stage efficiency reaction $R_0$.

Similarly, second reaction means for obtaining the pitch reaction $R_2$ of the LPT 42 greater than a corresponding reference pitch reaction $R_0$ which effects the peak efficiency for the LPT 42 may be used. Such second reaction means comprise the shape, including angular orientation, of the LPT blades 52 as illustrated in FIG. 2, which are shaped and oriented similarly to the blades 44 of the HPT 40. The overall shape of the turbine blades may be conventionally determined given the desired pitch reactions or velocity vectors and angular orientations disclosed.

An additional advantage in accordance with the present invention is the elimination of the conventionally known compressor discharge seal and the reduction of differential thrust forces, and, therefore, a relatively larger thrust bearing is not required. More specifically, a compressor discharge seal is typically utilized in the location indicated generally at 114 in FIG. 1, between the HPC 14 and the combustor 36. The compressor discharge seal is similar to a seal 116 illustrated in FIG. 1, which prevents or reduces the passage of flow past the seal 116 between the HPT nozzle 60 and the region below the combustor 36.

It is conventionally known that the pressure of the compressed air 30 at the discharge of the HPC 14 is relatively higher than the pressure of combustion gases located at station 2 between the HPT nozzle 60 and the HPT 40. The compressor discharge pressure acts in a forward direction over the aft facing area of the HPC blades 18 and the first shaft 20 in the region of 114 and the combustion gas pressure acts in an aft direction over the forward facing area of the HPT blades 44 and the disk 50. The pressure times the area at these locations results in a thrust force, among others, which acts on the shaft 20 in a forward direction at the HPC 14 and in an aft direction at the HPT 40. Inasmuch as the forward thrust is typically larger than the aft thrust, a net thrust differential exists, which conventionally requires the use of a compressor discharge seal to reduce the thrust loads such that they can be accommodated by a conventional thrust bearing. The bearing 76 in a conventional engine would comprise a thrust bearing to accommodate these forces. However, in view of the present invention, a relatively high pitch reaction $R_1$ of the HPT 40 results in a relatively high pressure between the HPT nozzle 60 and the HPT 40, and an increase in the pressure drop across the HPT 40, which may be predeterminedly utilized to effect a relatively lower net bearing thrust and eliminate the compressor discharge seal.

Accordingly, the engine 10 in accordance with one embodiment of the present invention may predeterminedly utilize relatively high reaction $R_1$ for the HPT 40 to effect a net reduction in thrust forces. Therefore, a conventional compressor discharge seal may be eliminated or made simpler for lower differential thrust loads.

Figure 11:
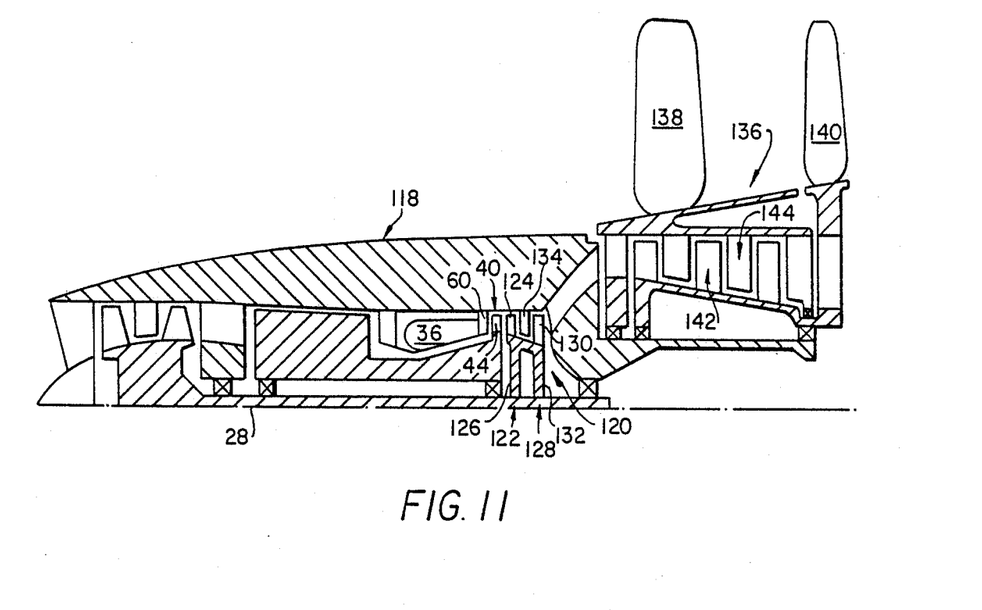
FIG. 11 is a schematic representation of a gas turbine engine in accordance with another embodiment of the invention having a turbine section including a single-stage HPT and two-stage LPT.

Illustrated in FIG. 11 is a schematic representation of a gas turbine engine 118 in accordance with another embodiment of the present invention. The forward portion of engine 118 is generally similar to the forward portion of engine 10 illustrated in FIG. 1 and includes the combustor 36, HPT nozzle 60 and a single-stage HPT 40 with like reference numerals indicating components similar to those illustrated in FIG. 1. The HPT 40 includes blades 44 attached to a single rotor disk. A two-stage intermediate pressure turbine (IPT) 120 is utilized in this embodiment of the invention. The IPT 120 includes a forward rotor 122 having a plurality of rotor blades 124 mounted to a forward disk 126, which disk 126 is mounted to the shaft 28. An aft rotor 128 includes a plurality of rotor blades 130 suitably attached to an aft rotor disk 132, which disk 132 is also attached to the shaft 28 for corotation with the forward rotor 122. Disposed between the first and second rotors 122 and 128 is a conventional stationary nozzle 134 including a plurality of circumferentially-spaced stator blades.

The engine 118 also includes an LPT 136 driving counterrotating propellers 138 and 140. The LPT 136 includes radially outwardly extending blade rows 142 which are fixedly connected to the aft propellers 140, and radially inwardly extending blade rows 144 which are fixedly connected to the forward propellers 138. The rows 142 and 144 are interdigitally disposed without intervening stationary nozzles.

The engine 118 illustrated in FIG. 11 is also defined by using pitch reactions and velocity vector diagrams.

In this embodiment of the invention, any one or all of the reactions may be greater than the reference reaction which effects peak efficiency for the respective stage. For example, the HPT blades 44 may effect generally the relatively high reaction $R_1$ as described above for the FIG. 1 embodiment of the invention.

As indicated above, reaction in accordance with one embodiment of the present invention is greater than that which would otherwise result in peak efficiency for a given turbine stage. Such relatively high reaction may be utilized in any one turbine stage or all turbine stages with one apparent limitation being the overall efficiency of the entire turbine engine. One new advantage of the present invention is to allow the additional tradeoff of a decrease in efficiency of a particular turbine stage for an increase in overall efficiency of the engine. Another advantage of the present invention is the elimination of the stator nozzle between turbine rotors resulting in a relatively shorter, lighter and less complex engine, which eliminates the need for efficiency-reducing cooling air which would otherwise be required for the nozzle. Furthermore, the relatively high reaction in accordance with one aspect of the invention may be utilized to reduce the size of a thrust bearing which would otherwise be utilized in the shaft joining the HPC and the HPT and also eliminate or reduce the need for any other more complex means of balancing the thrust such as a thrust balance seal.

There are several advantages in accordance with the present invention which may be utilized to advantage depending on the particular objectives desired for a particular engine design. Improved efficiency may be one objective, reduced need for thrust balancing may be another objective, and yet other objectives as above described may be desired. The resent invention allows predetermined selection of relatively high reaction for at least a single stage of a gas turbine engine for enjoying one or more of the advantages disclosed herein.

While there have been described herein what are considered to be preferred embodiments of the present invention, other modifications of the invention will be apparent to those skilled in the art from the teachings herein, and it is, therefore, desired to secure in the appended claims all such modifications as fall within the true spirit and scope of the invention. More specifically, and for example, yet another low pressure turbine without an upstream nozzle may be disposed between the LPT 42 and OGVs 110 of the FIG. 1 embodiment. In such an arrangement the LPT 42 would have high reaction and velocity vectors $W_2$ greater than $C_1$ in accordance with the invention. In yet another example, although the LPT 42 is operatively connected to an LPC 22, it may be connected to any conventional structure for obtaining work, such as a fan or output shaft.

Accordingly, what is desired to be secured by letters patent of the United States is the invention as recited in the following claims;

What is claimed is:

1. A gas turbine engine comprising:
   first means for compressing air;
   means for combusting compressed air received from said first compressing means with a fuel and generating combustion gases;
   a first turbine rotor including a plurality of first blades having hubs mounted to the circumference of a first disk rotatable in a first direction, said first blades being in flow communication with said combustion means for receiving said combustion gases for rotating said first turbine rotor;
   means for joining said first compressing means to said first turbine rotor for rotation therewith;
   a second turbine rotor including a plurality of second blades having hubs mounted to the circumference of a second disk rotatable in a second direction being opposite to said first direction, said second blades being in direct flow communication with said first blades for receiving said combustion gases for rotating said second turbine rotor; and
   means for obtaining a pitch velocity ($W_2$) of said gases at an outlet of and relative to said blades of at least one of said first and second turbine rotors which is greater than a pitch absolute velocity ($C_1$) of said gases at an inlet of said blades of said one turbine rotor, said blades of said one turbine rotor having pitch chord stagger angles (Y) greater than 30 degrees.

2. A gas turbine engine according to claim 1 wherein said velocity obtaining means further effects a pitch velocity ($W_1$) of said gases at said inlet of and relative to said blades of said at least one turbine rotor which is less than said pitch relative outlet velocity ($W_2$).

3. A gas turbine engine according to claim 2 wherein said velocity obtaining means comprises shape, including angular orientation, of said turbine blades of said one turbine rotor.

4. A gas turbine engine according to claim 2 wherein said velocity obtaining means further includes means for obtaining a pitch reaction of said one turbine rotor greater than a reference pitch reaction effecting a peak efficiency for a corresponding turbine stage.

5. A gas turbine engine according to claim 4 further including a stationary nozzle disposed between and in serial flow communication with said combusting means and said first turbine rotor, said first turbine rotor and said nozzle defining a first turbine stage, and wherein said reaction means comprises first reaction means for obtaining a first pitch reaction $R_1$ greater than a reference pitch reaction ($R_0$) of said first turbine stage, which includes a predetermined shape of said first turbine blades, and said first pitch reaction $R_1$ represents the percent static enthalpy drop of said gases flowing through said first turbine stage occurring in said first turbine rotor.

6. A gas turbine engine according to claim 5 wherein said first pitch reaction $R_1$ is defined by the expression:

$$R_1 = (H_{S2} - H_{S3})/(H_{S1} - H_{S3}) \times 100\%$$

where $H_{S2}$ represents static enthalpy at an inlet to said first turbine rotor,
where $H_{S3}$ represents static enthalpy at an outlet of said first turbine rotor, and
where $H_{S1}$ represents static enthalpy at an outlet of said combusting means.

7. A gas turbine engine according to claim 5 wherein said first pitch reaction $R_1$ is greater than 50 percent.

8. A gas turbine engine according to claim 5 wherein said first pitch reaction $R_1$ is about 76 percent.

9. A gas turbine engine according to claim 5 wherein each of said first turbine blades has relatively thick and thin leading and trailing edge portions, respectively; said first turbine rotor is said one turbine rotor; and said first turbine rotor is rotatable at speeds at least as large as those of said second turbine rotor.

10. A gas turbine engine according to claim 5 wherein each of said first turbine blades has relatively thick and thin leading and trailing edge portions, respectively, and is shaped for obtaining an absolute discharge swirl angle (S) greater than 50 degrees.

11. A gas turbine engine according to claim 5, further including:
    second means for compressing air disposed upstream of and in flow communication with said first compressing means; and
    means for joining said second compressing means to said second turbine rotor for rotation therewith.

12. A gas turbine engine according to claim 11 further including second reaction means for obtaining a second pitch reaction $R_2$ of said second turbine rotor, said second pitch reaction $R_2$ being greater than a reference pitch reaction of said second turbine rotor.

13. A gas turbine engine according to claim 12 wherein said first and second reaction means further comprise adjacent ones of said first and second turbine blades, respectively, being spaced for defining a converging channel for accelerating flow therethrough and a throat of minimum area located near trailing edges thereof.

14. A gas turbine engine according to claim 13 wherein said first and second turbine blades are shaped for obtaining reaction having minimum values at said hub of said first and second turbine blades, respectively, and increasing in value toward tips of said first and second blades.

15. A gas turbine engine according to claim 5 wherein air is dischargeable from said first compressing means at an outlet pressure and gases are channeled from said combusting means to said first turbine at an inlet pressure, said first compressing means having an outlet area and said first turbine having an inlet area, and said first pitch reaction $R_1$ has a value effective for generally balancing thrust generated by said outlet pressure acting on said outlet area and said inlet pressure acting on said inlet area.

16. A gas turbine engine according to claim 4, wherein said first turbine rotor comprises only a single rotor.

17. A gas turbine engine according to claim 16 wherein said second turbine rotor comprises forward and aft stages including forward and aft corotating rotors, respectively, each having a plurality of turbine blades having hubs mounted to the circumferences thereof, and a stationary turbine nozzle disposed between and in flow communication between said blades of said forward and aft turbine rotors.

18. A gas turbine engine according to claim 17 further including second means for compressing air disposed upstream of and in flow communication with said first compressing means;
and means for joining said second compressing means to both said forward and aft turbine rotors for corotation therewith.

19. A gas turbine engine comprising:
first means for compressing air;
second means for compressing air disposed upstream of and in flow communication with said first compressing means;
means for combusting compressed air received from said first compressing means with a fuel and generating combustion gases;
a first stationary nozzle disposed downstream of and in flow communication with said combusting means;
a first turbine rotor including a plurality of first blades having hubs mounted to the circumference of a first disk and rotatable in a first direction, said first blades being in flow communication with said first nozzle for receiving said combustion gases for rotating said first turbine, said first nozzle and first turbine rotor defining a first turbine stage;
means for joining said first compressing means to said first turbine rotor for rotation therewith;
a second turbine rotor, including a plurality of second blades having hubs mounted to the circumference of a second disk and rotatable in a second direction being opposite to said first direction, said second blades being in direct flow communication with said first blades for receiving said combustion gases for rotating said second turbine;
means for joining said second compressing means to said second turbine for rotation therewith;
means for obtaining a pitch velocity ($W_2$) of said gases at an outlet of and relative to said blades of at least one of said first and second turbine rotors which is greater than a pitch absolute velocity ($C_1$) of said gases at an inlet of said blades of said at least one turbine rotor;
first reaction means for obtaining a first pitch reaction $R_1$ of said first turbine rotor comprising a predetermined shape of said first turbine blades, and said first reaction $R_1$ representing the percent static enthalpy drop of said gases flowing through said first turbine stage occurring in said first turbine rotor;
second reaction means for obtaining a second pitch reaction $R_2$ of said second turbine rotor comprising a predetermined shape and orientation of said second turbine blades; and
at least one of said first and second reactions $R_1$ and $R_2$ being greater than a reference pitch reaction effecting a peak efficiency for said first and second turbine rotors, respectively.

20. A gas turbine engine according to claim 19 wherein said first pitch reaction $R_1$ is defined by the expression:

$$R_1 = (H_{S2} - H_{S3})/(H_{S1} - H_{S3}) \times 100\%$$

where $H_{S2}$ represents static enthalpy at an inlet to said first turbine rotor,
where $H_{S3}$ represents static enthalpy at an outlet of said first turbine rotor,
where $H_{S1}$ represents static enthalpy at an outlet of said combusting means; and
wherein said second reaction $R_2$ is defined by the expression:

$$R_2 = (H_{S3} - H_{S4})/(H_{T3} - H_{S4}) \times 100\%$$

where $H_{S4}$ represents static enthalpy at an outlet of said second turbine rotor;
where $H_{T3}$ represents total enthalpy at an inlet of said second turbine rotor; and
wherein said at least one reaction is said first reaction $R_1$ and said first reaction $R_1$ is greater than 50 percent.

21. A gas turbine engine according to claim 20 wherein $R_1$ has a value up to about 76 percent, and $R_2$ has a value of about 52 percent.

22. A gas turbine engine according to claim 21 wherein said first and second reaction means further comprise adjacent ones of said first and second turbine blades, respectively, being spaced for defining a converging channel therebetween for accelerating flow therethrough and for defining a throat of minimum are located near trailing edges thereof.

23. A turbine blade for a gas turbine engine having first and second adjacent counterrotating turbine rotors, the first rotor being rotatably connected to compressing means, at least one of said first and second turbine rotors including a plurality of said blades, each having leading and trailing edges, adjacent ones of said blades being spaced from each other for defining an inlet for receiving combustion gases and an outlet for discharging said gases, said blade further including means for obtaining a pitch velocity ($W_2$) of said gases at said outlet and relative to said blade which is greater than a pitch absolute velocity ($C_1$) of said gases at said inlet, said blade having a pitch chord stagger angle (Y) greater than 30 degrees.

24. A turbine blade according to claim 23 wherein said velocity obtaining means further effects a pitch velocity ($W_1$) of said gases at said inlet and relative to said blade which is less than said pitch relative outlet velocity ($W_2$).

25. A turbine blade according to claim 24 wherein said velocity obtaining means comprises shape, including angular orientation, of said turbine blade.

26. A turbine blade according to claim 23 wherein said velocity obtaining means further includes means for obtaining a pitch reaction of said at least one turbine rotor greater than a reference pitch reaction effecting a peak efficiency for a corresponding turbine stage.

27. A turbine blade according to claim 26 wherein said at least one turbine rotor comprises said first turbine rotor and said engine further includes a stationary nozzle disposed between and in serial flow communication with combusting means and said first turbine rotor, said first turbine rotor and said nozzle defining a first turbine stage, and wherein said reaction means comprises first reaction means for obtaining a first pitch reaction $R_1$ greater than a reference pitch reaction ($R_0$) of said first turbine stage, which includes a predetermined shape of said turbine blade, and said first pitch reaction $R_1$ represents the percent static enthalpy drop of said gases flowing through said first turbine stage occurring in said turbine rotor.

28. A turbine blade according to claim 27 wherein said first pitch reaction $R_1$ is defined by the expression:

$$R_1 = (H_{S2} - H_{S3})/(H_{S1} - H_{S3}) \times 100\%$$

where $H_{S2}$ represents static enthalpy at said inlet to said turbine rotor,
where $H_{S3}$ represents static enthalpy at said outlet of said turbine rotor, and
where $H_{S1}$ represents static enthalpy at an outlet of said combusting means.

29. A turbine blade according to claim 27 wherein said first pitch reaction $R_1$ is greater than 50 percent.

30. A turbine blade according to claim 27 wherein said first pitch reaction $R_1$ is about 76 percent.

31. A turbine blade according to claim 27 further including relatively thick and thin leading and trailing edge portions, respectively.

32. A turbine blade according to claim 27 further including relatively thick and thin leading and trailing edge portions, respectively, and said blade being shaped for obtaining an absolute discharge swirl angle (W) greater than 50 degrees.

33. A turbine blade according to claim 26 wherein said velocity obtaining means comprises shape, including angular orientation, of said turbine blade.

34. A turbine blade according to claim 33 wherein said turbine blade is shaped for use in said first turbine rotor.

35. A turbine blade according to claim 34 wherein said first turbine rotor comprises only a single rotor.

36. A turbine blade according to claim 33 wherein said turbine blade is shaped for use in said second turbine rotor.

37. A turbine blade according to claim 36 wherein said second turbine rotor comprises forward and aft stages including forward and aft corotating rotors, respectively, each having a plurality of said turbine blades having hubs mounted to the circumferences thereof, and a stationary turbine nozzle disposed between and in flow communication between said blades of said forward and aft turbine rotors.

38. A turbine blade according to claim 26 wherein said reaction means comprises a predetermined shape of said blade and said adjacent ones of said blades are spaced for defining a converging channel for accelerating flow therethrough and a throat of minimum area located near said trailing edges.

39. A turbine blade according to claim 38 shaped for obtaining reaction having minimum values at said hub of said blades and increasing in value toward tips of said blades.

40. A gas turbine engine comprising:
a first turbine rotor including a plurality of first blades having hubs mounted to the circumference of a first annular member rotatable in a first direction, said first blades being in flow communication with combustion means for receiving combustion gases therefrom for rotating said first turbine rotor;
a second turbine rotor including a plurality of second blades having hubs mounted to the circumference of a second annular member rotatable in a second direction being opposite to said first direction, said second blades being in direct flow communication with said first blades for receiving said combustion gases for rotating said second turbine rotor;
means for obtaining a pitch velocity ($W_2$) of said gases at an outlet of and relative to said blades of at least one of said first and second turbine rotors which is greater than a pitch absolute velocity ($C_1$) of said gases at an inlet of said blades of said one turbine rotor; and
said velocity obtaining means further including means for obtaining a pitch reaction of said one turbine rotor greater than a reference pitch reaction effecting a peak efficiency for a corresponding turbine stage.

41. A gas turbine engine according to claim 40 wherein said velocity obtaining means further effects a pitch velocity ($W_1$) of said gases at said inlet of and relative to said blades of said at least one turbine rotor which is less than said pitch relative outlet velocity ($W_2$).

42. A gas turbine engine according to claim 41 wherein said velocity obtaining means comprises shape, including angular orientation, of said turbine blades of said one turbine rotor.

43. A gas turbine engine according to claim 40 further including:
first means for compressing air;
means for combusting compressing air received from said first compressing means with a fuel and generating said combustion gases;
means for joining said first compressing means to said first turbine rotor for rotation therewith;
a stationary nozzle disposed between and in serial flow communication with said combusting means and said first turbine rotor;
said first turbine rotor and said nozzle defining a first turbine stage; and
wherein said reaction means comprises first reaction means for obtaining a first pitch reaction $R_1$ greater than a reference pitch reaction ($R_0$) of said firsts turbine stage, which includes a predetermined shape of said first turbine blades, and said first pitch reaction $R_1$ represents the percent static enthalpy drop of said gases flowing through said first turbine stage occurring in said first turbine rotor.

44. A gas turbine engine according to claim 43 wherein said first pitch reaction $R_1$ is defined by the expression:

$$R_1 = (H_{S2} - H_{S3})/(H_{S1} - H_{S3}) \times 100\%$$

where $H_{S2}$ represents static enthalpy at an inlet to said first turbine rotor,
where $H_{S3}$ represents static enthalpy at an outlet of said first turbine rotor, and
where $H_{S1}$ represents static enthalpy at an outlet of said combusting means.

45. A gas turbine engine according to claim 43 wherein said first pitch reaction $R_1$ is greater than 50 percent.

46. A gas turbine engine according to claim 43 wherein said first pitch reaction $R_1$ is about 76 percent.

47. A gas turbine engine according to claim 43 wherein each of said first turbine blades has relatively thick and thin leading and trailing edge portions, respectively; said first turbine rotor is said one turbine rotor; and said first turbine rotor is rotatable at speeds at least as large as those of said second turbine rotor.

48. A gas turbine engine according to claim 43 wherein each of said first turbine blades has relatively thick and thin leading and trailing edge portions, respectively, and is shaped for obtaining an absolute discharge swirl angle (S) greater than 50 degrees.

49. A gas turbine engine according to claim 43, further including:
second means for compressing air disposed upstream of and in flow communication with said first compressing means; and
means for joining said second compressing means to said second turbine rotor for rotation therewith.

50. A gas turbine engine according to claim 49 further including second reaction means for obtaining a second pitch reaction $R_2$ of said second turbine rotor, said second pitch reaction $R_2$ being greater than a reference pitch reaction of said second turbine rotor.

51. A gas turbine engine according to claim 50 wherein said first and second reaction means further comprise adjacent ones of said first and second turbine blades, respectively, being spaced for defining a converging channel for accelerating flow therethrough and a throat of minimum area located near trailing edges thereof.

52. A gas turbine engine according to claim 51 wherein said first and second turbine blades are shaped for obtaining reaction having minimum values at said hub of said first and second turbine blades, respectively, and increasing in value toward tips of said first and second blades.

53. A gas turbine engine according to claim 43 wherein air is dischargeable from said first compressed means at an outlet pressure and gases are channeled from said combusting means to said first turbine at an inlet pressure, said first compressing means having an outlet area and said first turbine having an inlet area, and said first pitch reaction $R_1$ has a value effective for generally balancing thrust generated by said outlet pressure acting on said outlet area and said inlet pressure acting on said inlet area.

54. A gas turbine engine according to claim 43 wherein said first turbine rotor comprises only a single rotor.

55. A gas turbine engine according to claim 54 wherein said second turbine rotor comprises forward and aft stages including forward and aft corotating rotors, respectively, each having a plurality of turbine blades having hubs mounted to the circumferences thereof, and a stationary turbine nozzle disposed between and in flow communication between said blades of said forward and aft turbine rotors.

56. A gas turbine engine according to claim 55 further including second means for compressing air disposed upstream of and in flow communication with said first compressing means;
and means for joining said second compressing means to both said forward and aft turbine rotors for corotation therewith.

57. A gas turbine engine according to claim 40 wherein said blades of said one turbine rotor have pitch chord stagger angles (Y) greater than 30 degrees.

58. A turbine blade for a gas turbine engine having a turbine rotor including a plurality of said blades each having leading and trailing edges, adjacent ones of said blades being spaced from each other for defining an inlet for receiving combustion gases and an outlet for discharging said gases, said blade further including means for obtaining a pitch velocity ($W_2$) of said gases at said outlet and relative to said blade which is greater than a pitch absolute velocity ($C_1$) of said gases at said inlet; and
said velocity obtaining means further including means for obtaining a pitch reaction of said turbine rotor greater than a reference pitch reaction effecting a peak efficiency for a corresponding turbine stage.

59. A turbine engine according to claim 58 wherein said velocity obtaining means further effects a pitch velocity ($W_1$) of said gases at said inlet and relative to said blade which is less than said pitch relative outlet velocity ($W_2$).

60. A turbine blade according to claim 59 wherein said velocity obtaining means comprises shape, including angular orientation, of said turbine blade.

61. A turbine blade according to claim 58 wherein said engine further includes a stationary nozzle disposed between and in serial flow communication with combusting means and said turbine rotor, said turbine rotor and said nozzle defining a first turbine stage, and wherein said reaction means comprises first reaction means for obtaining a first pitch reaction $R_1$ greater than a reference pitch reaction ($R_0$) of said first turbine stage, which includes a predetermined shape of said turbine blade, and said first pitch reaction $R_1$ represents the percent static enthalpy drop of said gases flowing through said first turbine stage occurring in said turbine rotor.

62. A turbine blade according to claim 61 wherein said first pitch reaction $R_1$ is defined by the expression:

$$R_1 = (H_{S2} - H_{S3})/(H_{S1} - H_{S3}) \times 100\%$$

where $H_{S2}$ represents static enthalpy at said inlet to said turbine rotor,
where $H_{S3}$ represents static enthalpy at said outlet of said turbine rotor, and
where $H_{S1}$ represents static enthalpy at an outlet of said combusting means.

63. A turbine blade according to claim 61 wherein said first pitch reaction $R_1$ is greater than 50 percent.

64. A turbine blade according to claim 61 wherein said first pitch reaction $R_1$ is about 76 percent.

65. A turbine blade according to claim 61 further including relatively thick and thin leading and trailing edge portions, respectively.

66. A turbine blade according to claim 61 further including relatively thick and thin leading and trailing edge portions, respectively, and said blade being shaped for obtaining an absolute discharge swirl angle (S) greater than 50 degrees.

67. A turbine blade according to claim 59 wherein said turbine rotor is a first turbine rotor and said engine includes a second turbine rotor rotatable in a direction opposite to that of said first turbine rotor and wherein said turbine blade is shaped for use in at least one of said first and second turbine rotors.

68. A turbine blade according to claim 67 wherein said turbine blade is shaped for use in said first turbine rotor.

69. A gas turbine engine according to claim 68 wherein said first turbine rotor comprises only a single rotor.

70. A turbine blade according to claim 67 wherein said turbine blade is shaped for use in said second turbine rotor.

71. A turbine blade according to claim 70 wherein said second turbine rotor comprises forward and aft stages including forward and aft corotating rotors, respectively, each having a plurality of said turbine blades having hubs mounted to the circumferences thereof, and a stationary turbine nozzle disposed between and in flow communication between said blades of said forward and aft turbine rotors.

72. A turbine blade according to claim 59 wherein said reaction means comprises a predetermined shape of said blade and said adjacent ones of said blades are spaced for defining a converging channel for accelerating flow therethrough and a throat of minimum area located near said trailing edges.

73. A turbine blade according to claim 72 shaped for obtaining reaction having minimum values at said hub of said blades and increasing in value toward tips of said blades.

74. A turbine blade according to claim 58 wherein said blade has a pitch chord stagger angle (Y) greater than 30 degrees.

* * * * *